United States Patent
Kiiski et al.

(10) Patent No.: US 10,221,361 B2
(45) Date of Patent: *Mar. 5, 2019

(54) RENEWABLE DIESEL FUEL COMPOSITION

(71) Applicant: Neste Oyj, Espoo (FI)

(72) Inventors: Ulla Kiiski, Hamari (FI); Jukka Myllyoja, Vantaa (FI); Marina Lindblad, Helsinki (FI); Elias Ikonen, Espoo (FI); Maaria Seläntaus, Helsinki (FI)

(73) Assignee: NESTE OYJ, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/392,606

(22) Filed: Dec. 28, 2016

(65) Prior Publication Data

US 2017/0183592 A1    Jun. 29, 2017

(30) Foreign Application Priority Data

Dec. 29, 2015 (EP) .................................... 15202871

(51) Int. Cl.
| | |
|---|---|
| *C10G 3/00* | (2006.01) |
| *C10L 1/08* | (2006.01) |
| *C10L 10/08* | (2006.01) |
| *C10L 1/02* | (2006.01) |

(52) U.S. Cl.
CPC ............... *C10G 3/40* (2013.01); *C10G 3/00* (2013.01); *C10G 3/46* (2013.01); *C10G 3/50* (2013.01); *C10L 1/026* (2013.01); *C10L 1/08* (2013.01); *C10L 10/08* (2013.01); *C10G 2300/1014* (2013.01); *C10G 2300/202* (2013.01); *C10G 2400/04* (2013.01); *C10L 2200/0446* (2013.01); *C10L 2200/0469* (2013.01); *C10L 2290/24* (2013.01); *Y02E 50/13* (2013.01); *Y02P 30/20* (2015.11)

(58) Field of Classification Search
CPC ..................................... C10G 3/40; C10G 3/50
See application file for complete search history.

(56) References Cited

U.S. PATENT DOCUMENTS

| | | |
|---|---|---|
| 2004/0049971 A1 | 3/2004 | Bernasconi et al. |
| 2010/0313467 A1 | 12/2010 | Lake et al. |
| 2012/0203043 A1* | 8/2012 | Wheeler ............... C07C 1/2078 585/242 |
| 2013/0079566 A1 | 3/2013 | Lin |

(Continued)

FOREIGN PATENT DOCUMENTS

| | | |
|---|---|---|
| WO | WO 02/002720 A2 | 1/2002 |
| WO | WO 2013/113976 A1 | 8/2013 |

(Continued)

OTHER PUBLICATIONS

Marathon MSDS Ultra Low Sulfur Diesel, Dec. 7, 2010, pp. 1-12 (Year: 2010).*

(Continued)

*Primary Examiner* — Philip Y Louie
*Assistant Examiner* — Alyssa L Cepluch
(74) *Attorney, Agent, or Firm* — Buchanan Ingersoll & Rooney PC

(57) ABSTRACT

Methods and uses of a good lubricity fraction obtainable from thermal treatment of levulinic acid and subsequent hydrogenation and fractionation are disclosed.

11 Claims, 1 Drawing Sheet

Conversion of lignocellulosic material to levulinic acid

(56) References Cited

U.S. PATENT DOCUMENTS

| | | |
|---|---|---|
| 2013/0144090 A1 | 6/2013 | Pansare et al. |
| 2013/0144091 A1 | 6/2013 | Pansare et al. |
| 2013/0144094 A1 | 6/2013 | Pansare et al. |
| 2013/0144098 A1 | 6/2013 | Pansare et al. |
| 2013/0217932 A1 | 8/2013 | Seck |
| 2013/0237728 A1 | 9/2013 | Lotero et al. |
| 2015/0018581 A1 | 1/2015 | Kettunen et al. |
| 2015/0018588 A1 | 1/2015 | Myllyoja et al. |
| 2015/0251168 A1 | 9/2015 | Kettunen et al. |

FOREIGN PATENT DOCUMENTS

| | | | |
|---|---|---|---|
| WO | WO 2005/144994 A1 | 10/2015 | |
| WO | WO 2015/144993 A1 | 10/2015 | |
| WO | WO-2015144993 A1 * | 10/2015 | ............. C10G 50/00 |

OTHER PUBLICATIONS

Briker et al. Diesel Fuel Analysis by GC-FIMS: aromatics, n-paraffins, and Isoparaffins. Nov. 10, 2000, Energy & Fuels, 2000, vol. 15, pp. 23-37. (Year: 2000).*

Extended European Search Report dated Jul. 7, 2016, by the European Patent Office in corresponding European Patent Application No. 15202871.8-1371. (9 pages).

* cited by examiner

Conversion of lignocellulosic material to levulinic acid
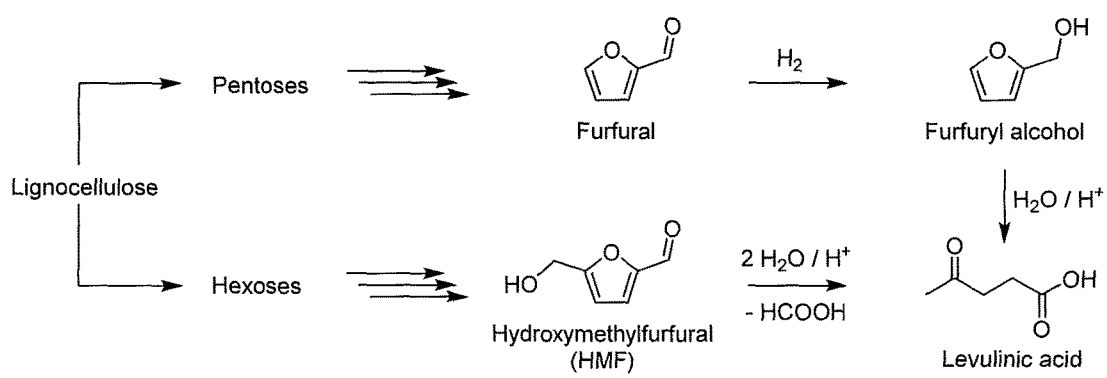

RENEWABLE DIESEL FUEL COMPOSITION

TECHNICAL FIELD

The present invention relates to the field of lubricity improvers, in particular lubricity improvers for diesel fuels obtained from renewable sources, methods for preparing diesel fuels having improved lubricity and uses of a lubricity improver obtainable from levulinic acid.

BACKGROUND ART

Production of hydrocarbons used as fuel or heavy oil components and chemicals from biomass are of increasing interests since they are produced from a sustainable source of organic compounds.

Levulinic acid is one of many platform molecules that may be derived from biomass. It may be produced from both pentoses and hexoses of lignocellulosic material (see FIG. 1) at relatively low cost. Some of the advantages and drawbacks of using levulinic acid as a platform molecule relates to the fact that it is considered to be a reactive molecule due to both its keto and acid functionality.

The drawbacks of using levulinic acid as a fuel component have been attempted solved by preparing derivatives, such as esters, or by thermal or catalytical conversion of levulinic acid. These products derived from levulinic acid have been proposed as components of fuels and chemicals.

Esters of levulinic acid have been suggested as fuel components, and in particular the methyl and ethyl esters have been suggested used in diesel fuel. Gamma-valerolactone (GVL), which may be obtained by reduction of levulinic acid, has been proposed for a fuel component as well. Further reduction of GVL to 2-methyltetrahydrofuran (MTHF) provides a product that could be blended with gasoline of up to 60%. Alkyl valerates produced from levulinic acid have also been suggested as biofuels.

WO 2015/144994 describes methods for thermal conversion of ketoacids. It is described that such thermal conversion increases the molecular weight of the ketoacids to allow the separation of compounds suitable for use as fuel or heavy oil components or chemicals, or as precursors for such products.

WO 2015/144993 describes a similar method for catalytic conversion of ketoacids. It is described that a dual function catalyst both suppresses potential coking reactions of the reaction intermediates and simultaneously catalyzes multiple types of C—C-coupling reactions enabling the production of higher molecular weight compounds at a good yield.

However, the two prior art methods cited above do not disclose how to improve the lubricity of diesel fuel, in particular paraffinic diesel, such as renewable diesel, or Ultra Low Sulphur Diesel (ULSD).

In particular paraffinic diesel and ULSD has a minimal content of sulphur. Hydrotreatment of diesel fraction removes sulphur, which provides a natural lubricity. The removal of the natural lubricity has to be compensated by adding a lubricity additive in order to meet the specifications WO 2002/002720 A2 discloses a class of esterified alkenyl succinic acids as lubricity additives.

US 2004/0049971 A1 discloses a lubricity additive containing monocarboxylic and polycyclic acids, which may be obtained from resinous trees.

SUMMARY OF INVENTION

The present invention was made in view of the prior art described above, and the object of the present invention is to provide additional lubricity improvers in the form of methods for preparing diesel fuel having improved lubricity as well as novel uses of upgraded levulinic acid fractions, in particular levulinic acid fractions derived from renewable sources.

To solve the problem, the present invention provides a method for preparing a diesel fuel having improved lubricity, the method comprising the steps of: a) providing in a reactor a feedstock comprising levulinic acid; b) subjecting the feedstock to one or more C—C-coupling reaction(s), where the C—C-coupling reaction(s) are conducted by heating the feedstock to a temperature of 200-500° C., in the presence or in the absence of a catalyst, and wherein the C—C-coupling reaction(s) are conducted in the liquid and/or gas phase; c) subjecting the C—C-coupling product of step b) to a hydrodeoxygenation step; d) separating a good lubricity fraction of the product of step c) having a boiling point between 180-360° C.; e) mixing the product under d) with a diesel hydrocarbon composition, the diesel hydrocarbon comprising fossil diesel or renewable diesel. The method may involve the following additional step f) no further isomerisation reactions are done to the mixed product under step e) and no isomerisation is done to the good lubricity fraction under step d).

That is, the inventors of the present invention in a first aspect of the invention found that both thermal and catalytic treatment of levulinic acid, or a feedstock comprising levulinic acid, in the absence of a catalyst increase the molecular weight of levulinic acid through C—C coupling reactions. It was surprisingly found that the particular fraction had good lubricity when it was hydrotreated, such as hydrodeoxygenated, but not isomerised. This was unexpected for several reasons. First, as the fractions obtained from levulinic acid would not contain any sulphur, which improves lubricity, as well as any sulphur present would have been removed during the hydrotreatment conditions, i.e. under the hydrodeoxygenation conditions. Secondly, when isomerising the good lubricity fraction alone or mixing the good lubricity fraction with a diesel hydrocarbon composition and then isomerising the mixture, it was observed that the lubricity decreased.

It was also found that if under step b), the C—C-coupling reaction(s) are conducted in the absence of a catalyst, as further significant improved lubricity fraction was obtained. The good lubricity fraction may be obtained from the product of the thermal treatment through further reaction steps. This good lubricity product both has a good lubricity as well as an acceptable cetane number that allows for large mixing ratios with diesel hydrocarbons. The good lubricity of the product is distinct for the thermally upgraded levulinic acid, whereas a similar procedure, where the levulinic acid is upgraded catalytically does not yield a product with such good lubricity as for the thermally upgraded product. Conducting the C—C-coupling reactions in the absence of a catalyst also has the advantage that processing costs are lower than other methods in the art employing catalysts.

The diesel hydrocarbon composition comprising fossil diesel or renewable diesel of step e) above may comprise at least 60 wt % hydrocarbons selected from one or both of n-paraffins or iso-paraffins boiling within the range of 180-360° C.

The diesel fuel composition may comprise at least 5 vol %, e.g. 10 vol %, of the good lubricity fraction and a major portion of the hydrocarbon composition.

The diesel hydrocarbon composition may be paraffinic diesel. The diesel hydrocarbon composition may be renewable diesel. The diesel hydrocarbon composition may be fossil diesel.

The diesel hydrocarbon composition may be low sulphur diesel, having a sulphur content of less than 0.1% by weight, for example having less than 0.05% by weight or less than 0.001% by weight.

The diesel hydrocarbon composition may be a mixture of renewable diesel and fossil diesel.

In accordance with the above description, there is also provided use of at least 5% by weight, e.g. 10% by weight, based on the total composition of a good lubricity fraction to improve the lubricity of a major portion of a fuel having a sulphur content of less than 0.2% by weight, e.g. less than 0.1% by weight, where the good lubricity fraction is obtainable by a method comprising the steps of: a) providing in a reactor a feedstock comprising levulinic acid; b) subjecting the feedstock to one or more C—C-coupling reaction(s), where the C—C-coupling reaction(s) are conducted by heating the feedstock to a temperature of 200-500° C., in the presence or in the absence of a catalyst, and wherein the C—C-coupling reaction(s) are conducted in the liquid and/or gas phase; c) subjecting the C—C-coupling product of step b) to a hydrodeoxygenation step; d) separating a good lubricity fraction of the product of step c) having a boiling point between 180-360° C.

The use may involve that under step b), the C—C-coupling reaction(s) are conducted in the absence of a catalyst.

The fuel may be a diesel fuel. The diesel fuel may comprise a major portion of hydrocarbons selected from one or both of n-paraffins or iso-paraffins boiling within the range of 150-400° C.

The fuel may contain no further lubricating additives.

BRIEF DESCRIPTION OF DRAWINGS

FIG. 1 shows a scheme illustrating conversion of lignocellulosic material to levulinic acid.

DESCRIPTION OF EMBODIMENTS

In describing the embodiments of the invention specific terminology will be resorted to for the sake of clarity. However, the invention is not intended to be limited to the specific terms so selected, and it is understood that each specific term includes all technical equivalents which operate in a similar manner to accomplish a similar purpose.

The inventors have found that both catalytic and thermal treatment of levulinic acid, or a feedstock comprising levulinic acid, at a temperature of above 200° C. with or without any added catalyst increase the molecular weight of levulinic acid through C—C coupling reactions to yield a mixture of oligomerised product. From this product a good lubricity fraction may be obtained through further reaction steps involving fractionating and hydrotreating, such as hydrodeoxygenating. This good lubricity product both has a good lubricity, i.e. a low lubricity value as measured in the examples as well as an acceptable cetane number that allows for large mixing ratios with diesel hydrocarbons. Preferably a thermal treatment of levulinic acid in the absence of a catalyst is conducted. This is because the lubricity of the product is improved for the thermally upgraded levulinic acid, whereas a similar procedure, where the levulinic acid is upgraded catalytically does not yield a product with such good lubricity as for the thermally upgraded product (see table 1 of example 3). Conducting the C—C-coupling reactions in the absence of a catalyst also has the advantage that processing costs are lower than other methods in the art employing catalysts.

Accordingly, here is provided a method for preparing a diesel fuel having improved lubricity, the method comprising the steps of: a) providing in a reactor a feedstock comprising levulinic acid; b) subjecting the feedstock to one or more C—C-coupling reaction(s), where the C—C-coupling reaction(s) are conducted by heating the feedstock to a temperature of 200-500° C., in the presence or in the absence of a catalyst, and wherein the C—C-coupling reaction(s) are conducted in the liquid and/or gas phase; c) subjecting the C—C-coupling product of step b) to a hydrotreatment step, e.g. a hydrodeoxygenation step; d) separating a good lubricity fraction of the product of step c) having a boiling point between 180-360° C.; e) mixing the product under d) with a diesel hydrocarbon composition comprising fossil diesel or renewable diesel f) no further isomerisation reactions are done to the mixed product under step e) and no isomerisation is done to the good lubricity fraction under step d).

As described herein the good lubricity fraction is used to denote the fraction obtainable according to the processes of the present invention. The term good lubricity is used because the good lubricity fraction of the product of step c) having a boiling point between 180-360° C. according to the invention would be considered to have a better lubricity as measured using HFRR compared to unadditized ultra low sulfur diesel (ULSD) for example lower than the fossil diesel (F1) of table 1 of example 3 having a wear scar as measured by HFRR of 653 μm. So the good lubricity fraction described herein may be characterised in having a wear scar as measured by HFRR of lower than 653 μm, such as lower than 550 μm or such as lower than 500 μm—see for example the lubricity products (L2 and L1) in example 3, table 1 having a wear scar as measured by HFRR of 496 and 219 μm, respectively. In some instances the good lubricity fraction is a very good lubricity fraction which may be characterised in having a wear scar as measured by HFRR of lower than 460 μm, such as lower than 400 μm, such as lower than 350 μm, or such as lower than 300 μm, or even lower than 250 μm—see for example the lubricity product (L1) in example 3, table 1 having a wear scar as measured by HFRR of 219 μm.

The feedstock may comprise as the major component levulinic acid, for example in some embodiments at least 30% such as at least 60%, at least 70%, at least 80%, at least 90%, at least 95% or 100% of the feedstock comprises levulinic acid. It is preferable that the feedstock is 100% levulinic acid. The feedstock may be obtained from processing of lignocellulosic material, and such processed material may be used directly, or purified to varying degrees before being used as a feedstock in the method of the present invention. The feedstock may comprise a mixture of levulinic acid in combination with angelica lactones, such as at least 10% of levulinic acid and at least 10% of angelica lactones. The feedstock may also contain derivatives, such as furfural, furfuryl alcohol and/or hydroxymethylfurfural.

The feedstock may contain water, for example the feedstock may have a water content of 15 wt % or less. The water content should be as low as possible, e.g. a water content of 10 wt % or less, such as 5 wt % or less, or 1 wt % or less, such as no water present. In some embodiments no external water is added during the C—C-coupling reaction(s), although internal water is produced in some of the condensation reactions.

External water may be added in an amount of 0.1 wt % to 10 wt % either to the feedstock and/or during the reactions, as e.g. steam.

In some embodiments the feedstock is fed into in a single reactor, or single reactor bed, for example a CSTR reactor, a trickle bed reactor or a continuous reactor. The reactor should be able to be pressurised, and to accommodate the feedstock. The reactor should have means, such as one or more inlets and/or outlets, e.g. to enable adding/withdrawing of feedstock. Means for controlling the pressure and temperature should also be present.

The molecular weight of levulinic is increased through one or more C—C-coupling reaction(s). Many C—C-coupling reactions are known in the art, and the skilled person would be able to identify such C—C-coupling reactions based on the reaction conditions provided. The C—C-coupling reactions may be ketonisation reactions or reactions proceeding through an enol or enolate intermediate. In some embodiments C—C-coupling reactions are selected from the list comprising: aldol-type reactions and condensations, ketonisations, reactions where the C—C-coupling involves an alkene, as well as other oligomerisation reactions. The C—C-coupling reactions may proceed with two identical molecules or may be a crossed reaction between two different molecules.

A number of catalysts catalyses the above reactions, and catalysts may be selected by the skilled person from catalysts known in the art, for example an acidic catalyst, see e.g. example 2. Further guidance on catalyst selection may be found in WO 2015/144993, which is hereby incorporated by reference in its entirety.

The C—C coupling reaction(s) may proceed in the absence of a catalyst system. It was found that subjecting the feedstock of the present invention to C—C-coupling reactions in the absence of a catalyst and at temperatures above 200° C. will increase the molecular weight of levulinic acid. Conducting the C—C-coupling reactions in the absence of a catalyst also has the advantage that processing costs are lower than other methods in the art employing catalysts. Also important is that the thermal treatment can be controlled so as to give the desired products in a useful yield without resulting too much in uncontrollable polymerisation reactions to products not suitable as e.g. liquid fuel components. While the levulinic acid of the feedstock in itself may be considered to catalyse a number of C—C-coupling reactions, including the aldol reaction/condensation through auto-catalysis, the feedstock is in the present context not considered to be the catalyst system. In the context of the present invention, absence of a catalyst system is considered to be in the absence of a catalyst system other than levulinic acid, such as the absence of a catalyst system in the solid phase.

The inventors found that thermal treatment of a feedstock comprising levulinic acid at temperatures between 200-500° C. in the absence of a catalyst increase the molecular weight of the ketoacids to allow the separation of compounds suitable for further processing into a good lubricity fraction. This property of improved lubricity for a diesel fuel is not one that would have been observed, because measurement of lubricity is usually something that is done for a final fuel composition, which would usually entail an isomerisation step and/or a mixing step with e.g. paraffinic diesel. Conducting the C—C-coupling reactions in the absence of a catalyst also has the advantage that processing costs are lower than other methods in the art employing catalysts.

With reference to levulinic acid (bp=245-246° C. at 1 bar) it was found that a suitable temperature range for conversion to dimer and oligomer product could be effected around the boiling point of levulinic acid. For example, the levulinic acid feedstock may be heated to a temperature of 205-400° C., such as a temperature of 245-350° C.

The reaction will suitably be performed for a time sufficient to convert the feedstock to C—C-coupling products. In some embodiments the C—C-coupling reaction(s) will be conducted for a reaction time sufficient to convert 40 wt % of the feedstock to C—C-coupling products. The reaction time may vary depending on the type of reactor used, such as between 30 min and 240 minutes, e.g. for 30-150 minutes. For example the reaction time may be between 30 min and 240 minutes calculated after the temperature has reached at least 200° C., such as at least 250° C.

In some embodiments the C—C-coupling reaction(s) are conducted predominantly in the liquid phase, as opposed to the gaseous phase, meaning that the reaction is at least predominantly taking place on in the liquid phase. In some embodiments the C—C-coupling reaction(s) are conducted entirely in the liquid phase.

The C—C-coupling reaction(s) may be conducted in a continuous flow reactor. Performing the reactions in a continuous flow reactor allows control over the temperature, pressure and flow rate of the feedstock, and makes it possible to heat the feedstock to above it's boiling point temperature, as well as to provide recycled streams.

When the feedstock is heated to around the boiling point in a closed reactor pressure will rise due to the vapour pressure of the feedstock. As the thermal C—C-coupling reactions proceed and generate $CO_2$ and water vapour the pressure will increase further.

In some embodiments the C—C coupling reaction(s) are conducted at a pressure of between 10-100 bar, such as a pressure of between 10-50 bar.

The reactor can also be pressurised by the products of the condensation reactions by sealing the reactor, heating the feedstock, thereby allowing the reactor to become pressurised by generation of $CO_2$ and water vapour from the reactions of the feedstock.

Additionally the pressure may also be controlled, by venting excess gasses if the pressure becomes too high. This enables the pressure to be controlled, for example by keeping the pressure between 15 and 30 bar.

The C—C-coupling reaction products obtained is further subjected to a Hydrotreatment step, such as, or including a hydrodeoxygenation (HDO) step to remove oxygen, which in some embodiments produce completely deoxygenated material. Hydrodeoxygenation conditions are generally known in the art, and a hydrodeoxygenation step may involve the presence of a hydrodeoxygenation (HDO) catalyst, which may be a hydrogenation metal on a support, such as for example a HDO catalyst selected from a group consisting of Pd, Pt, Ni, Co, Mo, or any combination of these. The hydrodeoxygenation step may for example be conducted at a temperature of 100-500° C. and at a pressure of 10-150 bar in the presence of hydrogen, for example the $H_2$/oil could be from 1000-10000 (nl/l) and a weight hourly space velocity (WHSV) of 0.1-5 W. The examples 1 and 2 describe a temperature of 310° C., pressure of 80 bar, $H_2$/oil of 2000 (nl/l) and a WHSV of 0.3 $h^{-1}$. For example the conditions could be a temperature of 250-400° C., pressure of 40-120 bar, $H_2$/oil of 1000-4000 (nl/l) and a WHSV of 0.1-1 $h^{-1}$.

The product obtained from the hydrodeoxygenation step is then separated, for example by fractionation by distillation. A good lubricity fraction is present in the fraction boiling from 180-360° C. It may for example be a fraction boiling between 180-340° C., such as between 180-320° C., for example between 200-320° C.

Preferably, no further isomerisation reactions are done to the good lubricity fraction either alone or in admixture with a diesel hydrocarbon composition.

The good lubricity fraction obtainable by the method described above may be mixed with a diesel hydrocarbon composition. A diesel hydrocarbon composition may for example be a middle distillate fuel oil boiling from about 150° C. to 400° C.

The diesel hydrocarbon may comprise at least 60 wt % hydrocarbons (for example more than 70 wt %, more than 80 wt %, more than 90 wt %, more than 95 wt %, such as more than 99 wt %) selected from one or both of n-paraffins or iso-paraffins boiling within the range of 150-400° C., such as 180-360° C., such as 180-320° C.

The diesel hydrocarbon composition may be paraffinic diesel. Paraffinic synthetic diesel generally has a very low content of sulfur and aromatics, and contains hydrocarbons selected from one or both of n-paraffins or iso-paraffins. Such paraffinic synthetic diesel may be obtained from biomass, and will be considered a renewable diesel.

The diesel hydrocarbon composition may be fossil diesel, which can also be called petroleum diesel or petrodiesel. It is produced from fractional distillation of crude oil refining products to obtain a diesel fraction between 150-400° C.

The diesel hydrocarbon composition may be low sulphur diesel, such as ultra low sulphur diesel (ULSD), having a sulphur content of less than 0.2% by weight, for example having less than 0.1% by weight, less than 0.05% by weight, such as ULSD having less than 0.005% by weight or less than 0.001% by weight. In the context of the present invention low sulphur diesel and ULSD is used for a diesel that has low sulphur content, regardless of whether or not it is a renewable or a fossil diesel. The diesel hydrocarbon composition may a mixture of renewable diesel and fossil diesel.

The diesel fuel composition obtained from the method may comprise both a good lubricity fraction and a hydrocarbon composition (e.g. diesel). The content of the good lubricity fraction may be at least 5 vol %, for example at least 10 vol %, such as 20 vol %, 30 vol %, 40 vol % or up to 50 vol % of the diesel fuel composition. The hydrocarbon composition (e.g. the diesel composition mixed with the good lubricity fraction) may be the major portion of the diesel fuel composition. When the good lubricity fraction is derived from a renewable source it further has the advantage that it increases the renewable content of the fuel it is added to, and for this reason is attractive to use also in larger mixing ratios without concern that the renewable content will be reduced in the fuel. The combination of the good lubricity fraction obtained from a renewable source with a renewable diesel provides a fuel obtained from a renewable source with acceptable lubricity properties, without the addition of further lubricity additives.

Depending on the HFRR wear scar values obtained in the good lubricity fraction, and the wear scar of the diesel hydrocarbon composition that it is blended with, the addition of e.g. 10 vol % of the good lubricity fraction may not be sufficient alone to bring the resultant fuel blend within the required wear scar of a suitable standard (e.g. EN590). However, the addition of the good lubricity product provides a reduction of the wear scar and consequently provides an improved lubricity of the fuel blend which will reduce the need to add further lubricity enhancers, thereby reducing overall use of lubricity enhancers.

The good lubricity fraction of the present invention is particularly suitable together with a renewable diesel or a paraffinic diesel because in addition to the lubricity improving characteristics it also has a higher density than a renewable diesel base fuel, and the addition of the good lubricity fraction will both improve the lubricity as well as improving the measured density of the fuel blend (see table 3 of example 3).

In accordance with the above description, there is also provided use of at least 5% by weight, such as at least 10% by weight based on the total composition of a good lubricity fraction to improve the lubricity of a major portion of a fuel having a sulphur content of less than 0.2% by weight, such as less than 0.1% by weight, e.g. less than 0.05 by weight, where the good lubricity fraction is obtainable by the method described herein, i.e. a method comprising the steps of: a) providing in a reactor a feedstock comprising levulinic acid; b) subjecting the feedstock to one or more C—C-coupling reaction(s), where the C—C-coupling reaction(s) are conducted by heating the feedstock to a temperature of 200-500° C., in the presence or in the absence of a catalyst, and wherein the C—C-coupling reaction(s) are conducted in the liquid and/or gas phase; c) subjecting the C—C-coupling product of step b) to a hydrodeoxygenation step; d) separating, for example by distillation, a good lubricity fraction of the product of step c) having a boiling point between 180-360° C.

The use may involve that under step b), the C—C-coupling reaction(s) are conducted in the absence of a catalyst.

The use may involve the good lubricity fraction under step c) having a boiling point between 180-360° C. It may for example be a fraction boiling between 180-340° C., such as between 180-320° C., for example between 200-320° C.

The good lubricity fraction may be used alone or in combination with another lubricity additive. The content of the good lubricity fraction in the total composition may be at least 5 wt %, such as for example at least 10 wt %, such as at least 20 wt %, at least 30 wt %, for example between 10 and 49 wt %, between 20 and 40 wt %, or between 20 and 25 wt %. The good lubricity fraction may also be used alone as described above, e.g. wherein no additional lubricity additive(s) is added, for example where there is not added a lubricity additive having a HFRR value equal to or lower than the high lubricity fraction, or where there is not added a lubricity additive having a HFRR value more than 10% or 20% lower than the HFRR value of the fuel to which it is being added.

The fuel may be a diesel fuel. The diesel fuel may for example be fossil diesel, such as fossil diesel having a boiling point range of 150-400° C. The diesel fuel may also be a paraffinic diesel, for example a renewable paraffinic diesel. Paraffinic diesel may be hydrotreated vegetable oil (HVO), Fischer-Tropsch (FT) diesel or mixtures thereof. For example, the diesel fuel may comprise a major portion of hydrocarbons selected from one or both of n-paraffins or iso-paraffins boiling within the range of 150-400° C., such as 180-360° C., such as 180-320° C.

When describing the embodiments of the present invention, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

The terms "comprising", "comprise" and comprises herein are intended by the inventors to be optionally substitutable with the terms "consisting of", "consist of" and "consists of", respectively, in every instance.

EXAMPLES

Example 1—Lubricity Improver from Thermal Treatment

Levulinic acid (LA) derived from biomass was heat treated without any catalyst. Thermal conversion of LA was done in a continuous tube reactor. Thermal treatment conversion was performed at 250-335° C. and using residence time from 0.5 hour to 1.2 hour. The total run length was about 30 days, from which a number of samples were obtained at different conditions.

One of these samples was prepared at a temperature of 300° C., pressure of 20 bar and residence time about 1 hour.

This sample was hydrotreated with sulphided NiMo on alumina support at a temperature of about 310° C., a pressure of 80 bar, $H_2$/oil of about 2000 (nl/l) and a WHSV of 0.3 $h^{-1}$.

The hydrotreated product was fractionated by distillation in order to obtain a lubricity improver having a distillation range of 180-360° C. The narrow range of 180-360° C. falls within a middle distillate range.

Example 2—Lubricity Improver from Catalytic Treatment

Levulinic acid (LA) derived from biomass was catalytically treated using an acidic ion-exchange resin (Amberlyst CH43, 0.7% Pd) as catalyst. The reactions were conducted at temperature of 130° C. and WHSV about 0.2 W.

The product obtained was then hydrotreated at a temperature of about 310° C., a pressure of 80 bar, $H_2$/oil of about 2000 (nl/l) and a WHSV of 0.3 $h^{-1}$.

The hydrotreated product was fractionated by distillation in order to obtain a lubricity improver having a distillation range of 180-360° C. The narrow range of 180-360° C. falls within a middle distillate range.

Example 3—Lubricity Measurements

Adequate lubricity is a necessity for a diesel fuel since fuel injection pumps of diesel engines are lubricated by the fuel.

Lubricity may be expressed as HFRR value (High Frequency Reciprocating Rig), and can be measured according to the method EN ISO 12156-1, lower HFRR value being better.

The European diesel fuel standard EN 590 has a requirement for the lubricity expressed as a HFRR value of maximum 460 μm wear scar according to the method EN ISO 12156-1.

The requirements under EN590 the below parameters are:
HFRR: Maximum 460 μm
Density: Maximum 845 kg/m³
Minimum 820 kg/m³
Minimum 800 kg/m³ (climate-related requirement—arctic or severe winter climates)
Cetane number.: at least 51
Additionally prEN15940 provides a standard proposal for paraffinic diesel, classifying it according to cetane number:
Class A: at least 70
Class B: at least 51

Below are the results from the lubricity tests together with calculated values for density and cetane number of the mixtures.

TABLE 1

Measured HFRR values, densities and cetane numbers of unadditized base fuels and lubricity improvers.

| Fuel | HFRR (μm) | Density (kg/m³) | Cetane number |
|---|---|---|---|
| Lubricity product from ex. 1 (L1) | 219 | 890 | 27 |
| Lubricity product from ex. 2 (L2) | 496 | 854 | 47 |
| Fossil diesel (F1) | 653 | 818 | 49.1 |
| Renewable diesel (F2) | 580 | 779 | 79.6 |

TABLE 2

Measured HFRR values and calculated densities and cetane numbers of blends of thermally processed product (L1) and Fossil diesel (F1) (*measured values).

| L1 (vol-%) | F1 (vol-%) | HFRR (μm) | Density (calc.) (kg/m³) | Cetane number (calc) |
|---|---|---|---|---|
| 0 | 100 | 653 | 818* | 49.1* |
| 10 | 90 | 570 | 825 | 46.9 |
| 25 | 75 | 510 | 836 | 43.6 |
| 50 | 50 | 393 | 854 | 38.1 |
| 100 | 0 | 219 | 890* | 27* |

TABLE 3

Measured HFRR values and calculated densities and cetane numbers of blends of thermally processed product (L1) and Renewable diesel (F2) (*measured values).

| L1 (vol-%) | F2 (vol-%) | HFRR (μm) | Density (calc.) (kg/m³) | Cetane no. (calc) |
|---|---|---|---|---|
| 0 | 100 | 580 | 779* | 79.6* |
| 10 | 90 | 543 | 790 | 74.3 |
| 25 | 75 | 527 | 807 | 66.5 |
| 50 | 50 | 341 | 835 | 53.3 |
| 100 | 0 | 219 | 890* | 27* |

It can be seen from table 1 that the thermally processed product (L1) significantly improves the lubricity when blended in to fossil (F1) or renewable (F2) diesel fuels, thus reducing or completely avoiding the need for further lubricity improvers. As shown in table 3 above below 460 μm HFRR values may be obtained depending on the blending ratio, e.g. a blending ratio above 25 vol-%, such as above 30 vol-% or above 35 vol-%. This enables savings in additional lubricity additivation costs. Furthermore the lubricity improver according to the present invention may be prepared from levulinic acid obtained from a renewable source, thus the lubricity improver will be considered a biocomponent for regulatory and specification purposes.

Furthermore, the 50:50 mixture of the thermally processed product (L1) with the renewable diesel (F2) actually produces a renewable diesel fulfilling the EN590 specification with regards to HFRR and cetane number without any further additives, and where the entire fuel blend is obtained from a renewable source. Additionally the density requirements according to EN590 can be met already with 25% thermally processed product.

The invention claimed is:

1. A method for preparing a diesel fuel having improved lubricity, the method comprising:

a) providing a feedstock containing levulinic acid to a reactor;
b) subjecting the feedstock to one or more C—C-coupling reactions to form a C—C coupling product, wherein the C—C coupling reactions are conducted by heating the feedstock to a temperature of 200-500° C. in the absence of a catalyst, and wherein the C—C-coupling reactions are conducted in a liquid and/or gas phase;
c) subjecting the C—C-coupling product of step b) to a hydrodeoxygenation step to form a product;
d) separating a lubricity fraction having a boiling point between 180-360° C. from the product; and
e) mixing at least a portion of the lubricity fraction with a diesel hydrocarbon composition to form the diesel fuel having improved lubricity, wherein the diesel hydrocarbon composition contains fossil diesel or renewable diesel.

2. The method according to claim 1, wherein the diesel fuel having improved lubricity includes at least 10 vol % and up to 50 vol % of the lubricity fraction.

3. The method according to claim 1, wherein the diesel fuel having improved lubricity contains at least 5% by weight of the lubricity fraction.

4. The method according to claim 3, wherein no further lubricity additives are added.

5. The method according to claim 1, wherein the diesel hydrocarbon composition is paraffinic diesel.

6. The method according to claim 1, wherein the diesel hydrocarbon composition is renewable diesel.

7. The method according to claim 1, wherein the diesel hydrocarbon composition is fossil diesel.

8. The method according to claim 1, wherein the diesel hydrocarbon composition is a mixture of renewable diesel and fossil diesel.

9. The method according to claim 1, wherein the diesel hydrocarbon composition is low sulphur diesel, having a sulphur content of less than 0.1% by weight.

10. The method according to claim 1, wherein the diesel hydrocarbon composition is low sulphur diesel, having a sulphur content of less than 0.001% by weight.

11. The method according to claim 1, wherein the diesel fuel having improved lubricity comprises a majority of hydrocarbons selected from one or both of n-paraffins or iso-paraffins boiling within the range of 150-400° C.

* * * * *